United States Patent
Saeki et al.

(10) Patent No.: US 8,646,438 B2
(45) Date of Patent: Feb. 11, 2014

(54) SUPERCHARGER INTAKE DUCT

(75) Inventors: Daisuke Saeki, Kakogawa (JP); Kazuo Tanaka, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/532,466

(22) Filed: Jun. 25, 2012

(65) Prior Publication Data

US 2012/0260896 A1 Oct. 18, 2012

Related U.S. Application Data

(63) Continuation of application No. PCT/JP2010/071119, filed on Nov. 26, 2010.

(30) Foreign Application Priority Data

Dec. 29, 2009 (JP) ................................. 2009-299076

(51) Int. Cl.
| F02B 33/00 | (2006.01) |
| F02B 37/00 | (2006.01) |
| F02M 35/10 | (2006.01) |
| F02B 33/40 | (2006.01) |
| F02M 35/16 | (2006.01) |
| F02B 27/02 | (2006.01) |

(52) U.S. Cl.
CPC .......... F02B 33/40 (2013.01); F02M 35/10118 (2013.01); F02M 35/10157 (2013.01); F02M 35/162 (2013.01); Y02T 10/144 (2013.01); F02B 27/02 (2013.01)
USPC .................................... 123/559.1; 123/184.56

(58) Field of Classification Search
CPC ............. F02B 33/40; F02M 35/10118; F02M 35/10157; F02M 35/162; Y02T 10/144
USPC ............ 123/559.1, 184.53, 184.56; 60/605.1, 60/611; 415/205–206, 211.2, 195; 285/179; 138/39; 417/295
IPC ........................ F02N 35/121,35/10; F02B 37/00
See application file for complete search history.

(56) References Cited

U.S. PATENT DOCUMENTS 2,069,640 A * 2/1937 Beardsley, Jr. ................ 415/195
2,153,069 A * 4/1939 Barr et al. ..................... 285/179

(Continued)

FOREIGN PATENT DOCUMENTS

| CN | 101052784 | 10/2007 | |
| EP | 1947299 A2 * | 7/2008 | ............. F01D 17/14 |

(Continued)

OTHER PUBLICATIONS

PCT/JP2010/071119 International Search Report, 2 pages. date of the actual completion of the International Search: Dec. 22, 2010.

(Continued)

*Primary Examiner* — Thai Ba Trieu

(57) ABSTRACT

An air intake duct (54) for fluid connecting between an air intake control valve unit (52) and a supercharger (60) includes a duct inlet (56) fluid connected with an outlet port (52b) of the air intake control valve (52) and oriented in a first direction (D1), a duct outlet (58) fluid connected with a suction port (60a) of the supercharger (60) and oriented in a second direction (D2) substantially perpendicular to the first direction (D1), and a duct body (74) for defining an air intake passage (78) extending from the duct inlet (56) to the duct outlet (58). The duct body (74) has a portion confronting the duct outlet (58), which is formed with a guide projection (80) that protrudes towards the duct outlet (58).

15 Claims, 6 Drawing Sheets

(56) References Cited

U.S. PATENT DOCUMENTS

| | | | |
|---|---|---|---|
| 3,072,389 A * | 1/1963 | MacInnes | 261/30 |
| 3,143,849 A * | 8/1964 | Glamann | 60/611 |
| 3,411,451 A * | 11/1968 | Matthias et al. | 285/179 |
| 3,523,743 A * | 8/1970 | Jolette | 415/211.2 |
| 3,735,782 A * | 5/1973 | Strscheletzky | 138/39 |
| 4,550,794 A * | 11/1985 | Inoue et al. | 60/605.1 |
| 4,569,636 A * | 2/1986 | Bauer et al. | 417/295 |
| 4,676,717 A * | 6/1987 | Willyard et al. | 415/206 |
| 4,995,645 A * | 2/1991 | Pausch | 285/179 |
| 5,257,901 A * | 11/1993 | Malchow | 415/206 |
| 5,340,276 A * | 8/1994 | Norris et al. | 415/211.2 |
| 6,520,738 B2 * | 2/2003 | Sheoran et al. | 415/205 |
| 7,300,074 B1 * | 11/2007 | Paulson | 285/179 |
| 7,305,827 B2 * | 12/2007 | Arnold et al. | 60/605.1 |
| 8,449,250 B2 * | 5/2013 | Anschel et al. | 415/206 |
| 2007/0028884 A1 * | 2/2007 | Atsumi | 123/184.53 |
| 2008/0163624 A1 * | 7/2008 | Augustinson et al. | 60/624 |
| 2012/0192839 A1 * | 8/2012 | Arima et al. | 123/559.1 |

FOREIGN PATENT DOCUMENTS

| | | | | |
|---|---|---|---|---|
| JP | 60119328 A | * | 6/1985 | F02B 37/00 |
| JP | 04047127 A | * | 2/1992 | F02B 37/00 |
| JP | 2007077860 A | * | 3/2007 | F02M 35/12 |
| JP | 2007211697 A | * | 8/2007 | F02B 37/00 |
| JP | 2008202436 A | * | 9/2008 | F02M 35/12 |
| JP | 2008-542602 | | 11/2008 | |
| JP | 2009-264339 | | 11/2009 | |
| WO | WO 2006128827 A1 | * | 12/2006 | F01D 17/16 |

OTHER PUBLICATIONS

PCT Application No. PCT/JP2010/071119 International Preliminary Report on Patentability, dated Aug. 14, 2012, 7 pages.

Chinese Patent Application No. 201080058147.6 Office Action dated Dec. 4, 2013, 8 pages with partial English translation.

* cited by examiner

SUPERCHARGER INTAKE DUCT

CROSS REFERENCE TO THE RELATED APPLICATION

This application is a continuation application, under 35 U.S.C §111(a) of international application No. PCT/JP2010/071119, filed Nov. 26, 2010, which claims priority to Japanese patent application No. 2009-299076, filed Dec. 29, 2009, the entire disclosure of which is herein incorporated by reference as a part of this application.

BACKGROUND OF THE INVENTION

1. Field of the Invention

The present invention relates to an intake duct for a supercharger and, more particularly, to an air intake duct that fluid connects between a suction port of the supercharger and an outlet port of an air intake control valve.

2. Description of Related Art

In the motorcycle equipped with a supercharger, it is quite often that in order to reduce the mechanical loss, an air intake control valve for adjusting the amount flow of air to be introduced into the supercharger is disposed at a location upstream of the supercharger with respect to the direction of flow of the air. In such case, the air intake control valve is generally so disposed that a valve shaft or valve stem of such air intake control valve may lie perpendicular to a shaft center of the supercharger. By way of example, the valve shaft of the air intake control valve is disposed horizontally and the shaft axis of the supercharger is disposed parallel to a rotary shaft of a motorcycle combustion engine.

Accordingly, if in order to save the space around the combustion engine the air intake control valve is disposed above or below the supercharger, the angle depicted between an axis of an outlet of the air intake control valve and an axis of the inlet of the supercharger will form an angle of substantially 90°. As a result thereof, a tubing or a piping fluid connecting between the both will be curved at an angle of substantially 90° and, accordingly, detachment of the air flowing within this piping will occur on an inner side of the piping so curved, accompanied by generation of noises attributable to the air flow. In view of this, suggestion has been made to use a projection inside such a 90° curved portion of the piping so that the flow of the air can be disturbed to uniformize the velocity distribution of the air flow. In this respect, see the patent document 1 listed below.

PRIOR ART LITERATURE

[Patent Document] JP Laid-open Patent Publication No. 2007-77860

It has, however, been found that the system suggested in the patent document 1 listed above is liable to result in a considerable turbulence in the air flow, and, therefore, this does not appear to bring about a satisfactory supercharging efficiency.

SUMMARY OF THE INVENTION

In view of the foregoing, the present invention has been devised to substantially eliminate the problems and inconveniences inherent in the prior art and is intended to provide a supercharger intake duct that can bring about an increased supercharging efficiency.

In order to accomplish the foregoing object of the present invention, there is provided an air intake duct for fluid connecting between an air intake control valve unit and a supercharger includes a duct inlet fluid connected with an outlet port of the air intake control valve and oriented in a first direction, a duct outlet fluid connected with a suction port of the supercharger and oriented in a second direction substantially perpendicular to the first direction, and a duct body for defining an air intake passage extending from the duct inlet to the duct outlet. The duct body has a portion confronting the duct outlet, which portion is formed with a guide projection that protrudes towards the duct outlet. It is to be noted that the term "substantially perpendicular" referred to hereinabove and hereinafter should be construed as meaning the angle within the range of 80 to 90°.

According to the structural features, because the air intake duct includes the duct inlet, fluid connected with the air intake control valve and oriented in the first direction, and the duct outlet fluid connected with the suction port of the supercharger and oriented in the second direction, the air intake passage within the air intake duct is curved an angle of 90°. In such a 90° curved configuration, since the guide projection is formed so as to protrude from a portion of a wall surface of the air intake duct which confronts the duct outlet in a direction towards the duct outlet, an intake air is guided and rectified by the guide projection before it is smoothly introduced in the duct outlet. As a result thereof, the flow passage loss, resulting from a turbulent flow within the air intake duct, is reduced, and also the air rectified and free from turbulence is introduced into the supercharger. By the effect of the reduction of the flow passage loss and the rectifying function both taking place within the air intake duct in the manner described above, the supercharging efficiency of the supercharger disposed downstream thereof can be increased.

In a preferred embodiment of the present invention, the guide projection is preferably formed in a fashion coaxial with an axis of the duct outlet. In this case, the guide projection is preferably of a conical shape. According to this structural features, since the air flow is rectified so as to flow uniformly in a peripheral direction about an axis of the duct outlet, any bias in air flow relative to the duct outlet can be suppressed and the further rectified intake air can be introduced into the supercharger, resulting in an increase of the supercharging efficiency of the supercharger.

In another preferred embodiment of the present invention, a major portion of the air intake passage may be formed within the duct body so as to have a larger passage area than that of the duct inlet.

It is to be noted that the term "passage area" referred to hereinabove and hereinafter is intended to mean a cross sectional surface area of the passage taken along a line perpendicular to an axis line of such passage. Also, the wording "a major portion of the air intake passage" referred to hereinabove and hereinafter is intended to mean a portion of the air intake passage which extends a distance that is one half or more of the entire length of the passage from the duct inlet to the duct outlet.

The feature that the major portion of the air intake passage is formed within the duct body so as to have a larger passage area than that of the duct inlet results in the lowering of the flow velocity of the intake air in that major portion of the air intake passage to a value lower than that at the duct inlet and, as a result, the pipe friction loss caused by the frictional loss at an inner surface of the air intake duct is minimized.

Where the major portion of the air intake passage has the passage area larger than that at the duct inlet, the duct body is, when viewed in a direction conforming to the axis of the duct outlet, preferably gradually flared in width from the duct inlet towards the duct outlet. This structural feature allows the passage to be so formed as to extend a substantial distance from the duct inlet to the duct outlet with the passage area gradually increasing and, accordingly, the intake air is guided smoothly to the duct outlet while the air flow through this passage is decelerated. Therefore, the frictional loss at the duct inner surface is reduced, and also, separation of the air flow from the duct inner surface be suppressed. As a result, the intake air is smoothly guided to the supercharger and the supercharging efficiency of the supercharger is further increased accordingly.

In a further preferred embodiment of the present invention, the duct outlet is preferably formed with a funnel having a passage area increasing in a direction inwardly of the duct body. This structural feature permits the air flow to be throttled by the funnel as the air inside the air intake duct flows towards the duct outlet and, accordingly, an undesirable occurrence of the separation in the vicinity of the duct outlet is avoided and, as a result thereof, the air is smoothly guided towards the supercharger, resulting in the further increase of the supercharging efficiency.

Where the duct inlet is formed in an upper portion of the duct body and the duct outlet is formed in a lower portion of the duct body, the funnel referred to above may be formed only in an upper half of the duct outlet. According to this structural feature, the intake air flows from the upper portion down to the lower portion and, accordingly, the provision of the funnel in the upper half of the duct outlet is effective to avoid the generation of the separation by rectifying the air flow in the vicinity of the duct outlet.

In a still further preferred embodiment of the present invention, the duct inlet is preferably fluid connected with the outlet port of the air intake control valve by means of a fastening member, in which case the duct outlet is inserted into a suction port of the supercharger. According to this structural feature, since the duct outlet is supported having been inserted into the suction port of the supercharger, mere fastening of the duct inlet to the outlet port of the air intake control valve makes it possible to easily fluid connect the air intake duct between the air intake control valve and the supercharger.

The present invention also provides a motorcycle of a type employing the air intake duct of the present invention. This air intake duct in the motorcycle is disposed rearwardly of a cylinder block of a combustion engine and, on the other hand, the air intake control valve has a valve shaft disposed parallel in a widthwise direction of a motorcycle body. The supercharger in the motorcycle has a shaft axis disposed parallel to an axis of a rotary shaft of the combustion engine. According to this feature, a motorcycle equipped with the supercharger excellent in supercharging efficiency can be obtained.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described in detail with particular reference to the accompanying drawings.

Figure 1:
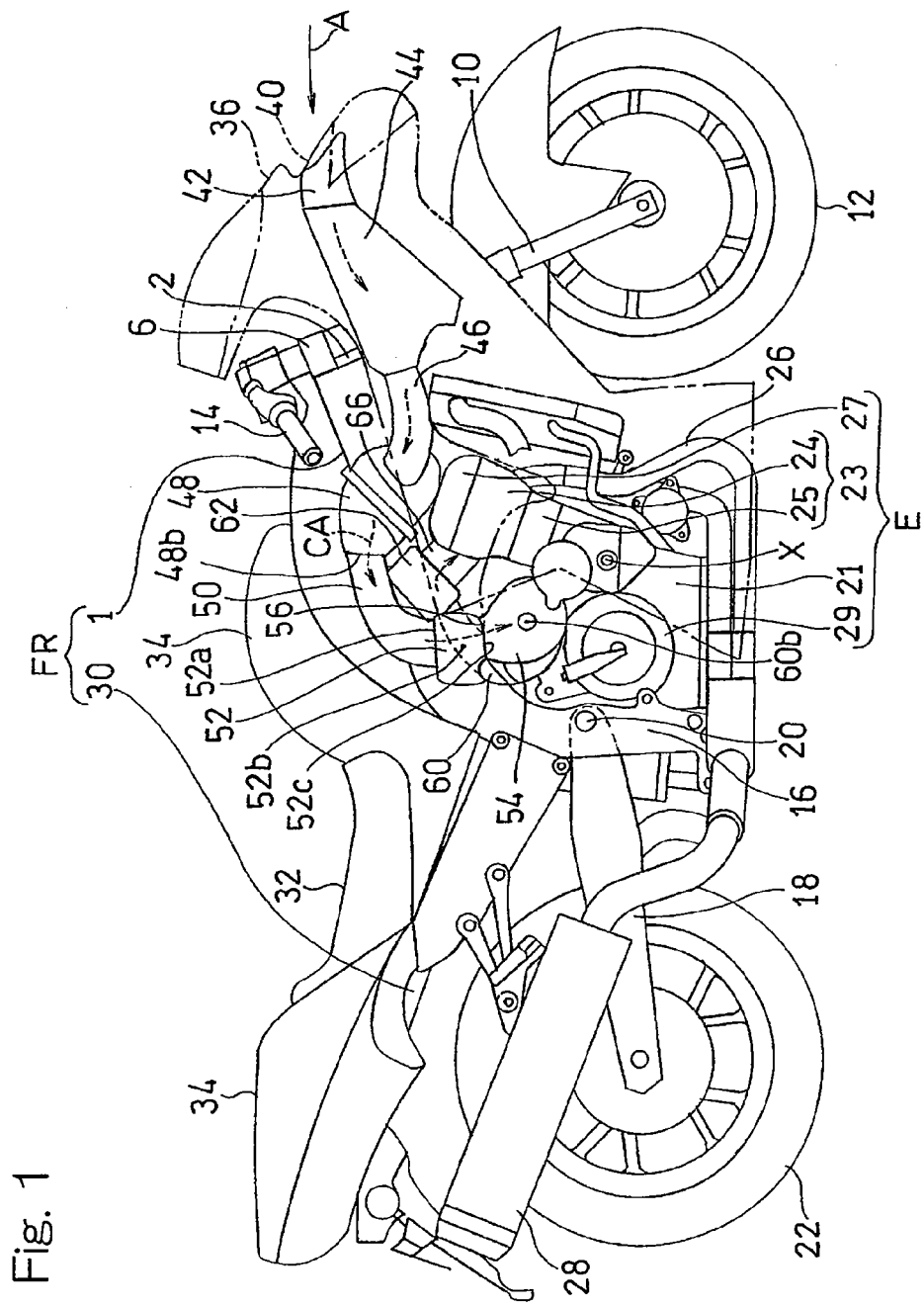
FIG. 1 is a side view showing a motorcycle equipped with a motorcycle combustion engine of a type employing an air intake duct for a supercharger, which duct is designed in accordance with a preferred embodiment of the present invention.

FIG. 1 illustrates, in a side view, a motorcycle to which an air intake duct for a supercharger in accordance with a preferred embodiment of the present invention is applicable. This motorcycle includes a motorcycle frame structure FR made up of a front frame section and a rear frame section. A head block 2 is fitted to a front end portion of a main frame 1 forming a part of the front frame section of the motorcycle frame structure FR and a front fork assembly 10 is fitted to this head block 2 though a steering shaft (not shown), which is rotatably inserted through the head block 2, with a front wheel 12 rotatably supported at a lower end portion of the front fork assembly 10. A handlebar 14 is connected with an upper end portion of the front fork assembly 10.

The main frame 1 has a lower rear end portion provided with a swingarm bracket 16, and a swingarm 18 is supported by this swingarm bracket 16 for movement up and down about a pivot pin 20 inserted through a front end portion of the swingarm bracket 16. A rear wheel 22 is rotatably supported by, a rear end portion of the swingarm 18 remote from the swingarm bracket 16.

The motorcycle combustion engine employed in the practice of the preferred embodiment is in the form of a multicylinder combustion engine E and this multicylinder combustion engine E is mounted on a lower intermediate portion of the main frame 1. The combustion engine E is of a structure in which a cylinder 25 is mounted on an upper portion of a crankcase 21 and a cylinder head 24 is mounted on an upper portion of the cylinder 25, the cylinder 25 and the cylinder head 24 cooperating with each other to define an engine cylinder block 23.

An upper portion of the cylinder head 24 is covered by a cylinder head cover 27 and a transmission casing 29 is positioned rearwardly of the crankcase 21. The cylinder head 24 is fluid connected with a plurality of exhaust pipes 26, which are, after having extended from a front side of the combustion engine E and then beneath the combustion engine E, connected with mufflers 28 disposed on respective opposite sides of a motorcycle body.

The main frame 1 has a rear portion provided with a seat rail assembly 30 rigidly connected therewith so as to form a part of the rear frame section of the motorcycle frame structure FR, with a motorcycle rider's seat 32 and a fellow passenger's seat 34 mounted on this seat rail assembly 30. A fuel tank 34 is mounted on an upper portion of the main frame 1 and positioned substantially intermediate between the handlebar 14 and the rider's seat 32. Also, a front portion of the motorcycle body has a fairing 36 mounted thereon, which fairing 36 is made of a synthetic resin and is so shaped as to enclose a forward area of the handlebar 14 and left and right front side areas of the motorcycle body. This fairing 36 has an air intake opening 40 defined therein for the introduction of the incoming air that is eventually used as a part of the air/fuel mixture to be combusted in the combustion engine E.

Figure 2:
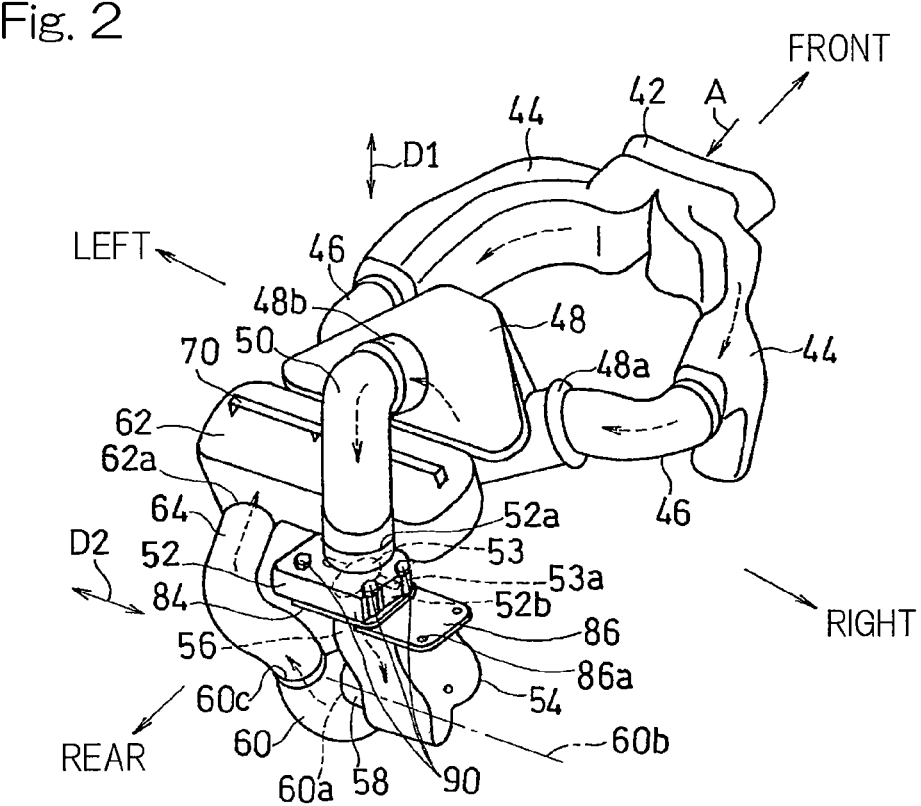
FIG. 2 is a perspective view showing an air intake system for the motorcycle combustion engine as viewed from diagonally downwardly and rearwardly of the motorcycle.

A ram air duct 42 having a front end opening defined therein is disposed forwardly of the head block 2 and is supported by the fairing 36 with the front end opening thereof positioned in alignment with the air intake opening 40 in the fairing 36. As best shown in FIG. 2, the ram air duct 42 has a rear end fluid connected with a pair of left and right air ducts 44 which extend in a direction rearwardly of the motorcycle body while passing laterally outwardly of the main frame 1. With the ram air duct 42 so configured as described above, a part of the incoming air of a pressure equal or higher than the atmospheric pressure can be introduced into the air ducts 44 through the ram air duct 42.

Each of the air ducts 44 is fluid connected with an air induction tube 46. As best shown in FIG. 1, an air cleaner unit 48 is disposed immediately above the cylinder head cover 27 and supported by the main frame 1. Each of the air induction tubes 46 referred to above extends laterally outwardly of the motorcycle body towards a direction rearwardly of the motorcycle body, then curved at a location above the cylinder head 24 so as to extend towards a mid-center in the widthwise direction of the motorcycle body, and is finally fluid connected with a forward oriented inlet 48a of the air cleaner unit 48 after having passed through the main frame 1.

The air cleaner unit 48 also has a rearward oriented outlet 48b, with which a first intermediate tube 50 is fluid connected. This first intermediate tube 50 extends a short distance rearwardly from the rearward oriented outlet 48b of the air cleaner unit 48, then curved so as to extend downwardly, and is finally fluid connected with an upwardly oriented inlet port 52a of an air intake control valve unit 52.

The air intake control valve unit 52 is positioned on the right side with respect to the motorcycle mid-center plane of the motorcycle body, i.e., with respect to a center line extending in a longitudinal direction of the motorcycle body and rearwardly of the cylinder block 23, best shown in FIG. 1, and above the transmission casing 29 and is supported by the combustion engine E in a manner as will be detailed later. The air intake control valve unit 52 includes, for example, a butterfly valve 53 having its valve shaft or valve stem 53a extending substantially horizontally and, in the illustrated embodiment, parallel to the widthwise direction (leftward and rightward direction) of the motorcycle body. The air intake control valve unit 52 is operable to suppress the amount of an intake air flow to be introduced to thereby control the work of a supercharger 60 as will be described later and, accordingly, the control performed by the air intake control valve unit 52 contributes to the reduction of the mechanical loss and to the improvement of the mileage or fuel efficiency.

Figure 3:
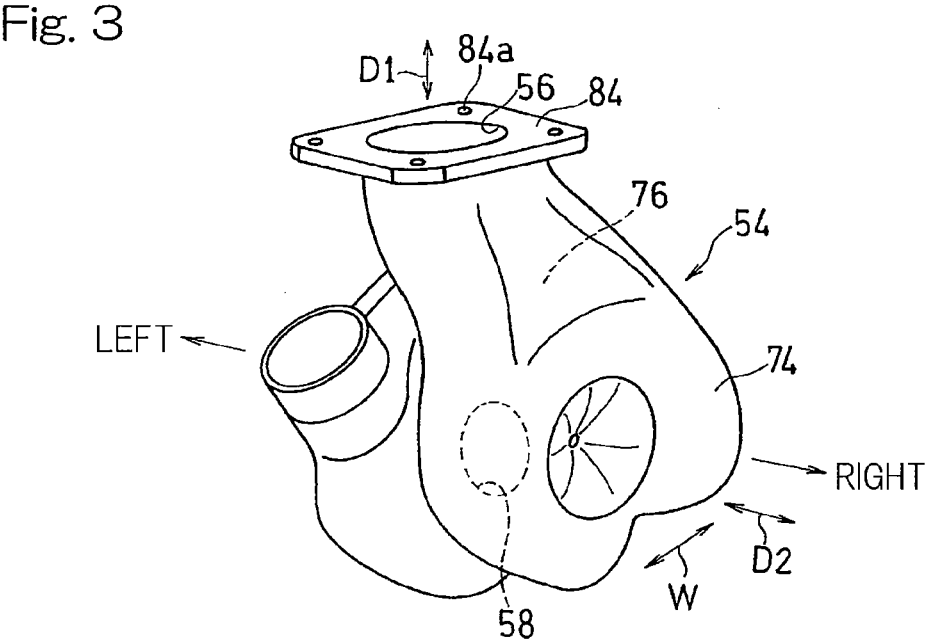
FIG. 3 is a perspective view showing the air intake duct.

The air intake control valve unit 52 has an outlet port 52b, with which a duct inlet 56 formed in an upper portion of an air intake duct 54 made of a synthetic resin is fluid connected. This air intake duct 54 is positioned below the air intake control valve unit 52 and a duct outlet 58 formed in a lower portion of the air intake duct 54 is, as best shown in FIG. 2, fluid connected with a suction port 60a of the supercharger 60. As shown in FIG. 3, the duct inlet 56 is oriented in a first direction D1, which is substantially parallel to the vertical direction, whereas the duct outlet 58 is oriented in a horizontal direction, which is a second direction D2 substantially perpendicular to the first direction D1 referred to above and, in the instance as shown, the leftward and rightward direction. It is to be noted that the perpendicularity of the first direction D1 to the second direction D2 is intended to mean that those two directions are oriented in respective directions offset an angle of 80 to 90° relative to each other and is meant to encompass not only the case, in which the duct inlet 56 and the duct outlet 58 have respective axes that are perpendicular to each other, but also the case in which those axes of the duct inlet and outlet 56 and 58 are spatially displaced relative to each other without intersecting with each other. In this way, the air intake duct 54 is in position to guide the intake air, introduced from above, towards the leftward and rightward direction after it has been deflected an angle of substantially 90°. In any event, the details of the air intake duct 54 will be described later.

The supercharger 60 is in the form of a centrifugal type supercharger, which is positioned on a substantially center line extending in the forward and rearward direction and rearwardly of the cylinder block 23 and, at the same time, above the reduction gear unit casing 29. The supercharger 60 has a horizontal shaft axis 60b, more specifically a shaft axis 60b lying parallel to a rotary shaft X of the combustion engine E, and is adapted to be driven by the rotary shaft X through an endless chain or a train of gears. As best shown in FIG. 2, the suction port 60a of the supercharger 60 opens towards the horizontal direction, which is the second direction D2 substantially perpendicular to the first direction D1 and is, in the embodiment now under discussion, laterally rightwards of the widthwise direction (leftward and rightward direction) of the motorcycle body. The supercharger 60 of the kind described above is operable to compress the intake air, which has been sucked through the suction port 60a, and subsequently discharge it from a discharge port 60c of the supercharger 60, which port 60c is oriented substantially upwardly.

A surge tank 62 is disposed rearwardly above the cylinder head 24, best shown in FIG. 1, and below the air cleaner unit 42. The surge tank 62 has a rearwardly downwardly oriented tank inlet portion 62a defined therein and fluid connected with the discharge port 60c of the supercharger 60 through a second intermediate tube 64, best shown in FIG. 2. A throttle body 66 is fluid connected between the surge tank 62, shown in FIG. 1, and the cylinder head 24. The surge tank 62 is used to accumulate the intake air supplied from the supercharger 60 and is supported by the combustion engine E through the throttle body 66.

The surge tank 62 has an upper surface on which a top injector 70 is mounted. This top injector 70 is used to inject a fuel in an atomized form into the surge tank 62 to thereby supply the fuel and also brings about such an effect as to lower an intake air temperature within the surge tank 62 due to latent heat of vaporization of the fuel. Although in the embodiment now under discussion, the top injector 70 is shown as employed in four in number in a row parallel to the widthwise direction of the motorcycle body while being oriented towards the throttle body 66 best shown in FIG. 1, the number and the site of installation are not necessarily limited to those described hereinabove.

Referring to FIG. 3, the air intake duct 54 has the duct inlet 56 and the duct outlet 58 as hereinabove described and also has an air intake passage 76 defined within the interior of it so as to extend from the duct inlet 56 to the duct outlet 58. A duct body 74 including a major portion thereof, which portion contains most parts of the air intake passage 76, is curved smoothly from the duct inlet 56 to the duct outlet 58 while being smoothly bulged outwardly in the widthwise direction W of the motorcycle body. In this way, the duct body 74 is of a structure, in which, when viewed in a direction conforming to an axis C1 of the duct outlet 58, the air intake passage 76 has its width increasing from the duct inlet 56 to the duct outlet 58 and, on the other hand, as best shown in FIG. 4, the thickness t of the air intake passage 76 as measured in the widthwise direction of the motorcycle body does not change so much.

The air intake passage 76 within the interior of the air intake duct 54 is curved at an angle of 90°. A wall surface 78 of the duct body 74, which confronts the duct outlet 58, is formed with a guide projection 80 so as to protrude towards the duct outlet 58. In the embodiment now under discussion, the guide projection 80 has a substantially conical shape having an axis line coaxial with the axis C1 of the duct outlet 58. It is, however, to be noted that the shape of the guide projection 80 is not necessarily limited to that shown and described, but may be, for example, a pyramid shape or a circular truncated cone shape. Also, an inclined surface of the guide projection 80 may be linear, but if it is a curved shape, the intake air being introduced can be smoothly guided.

Figure 5:
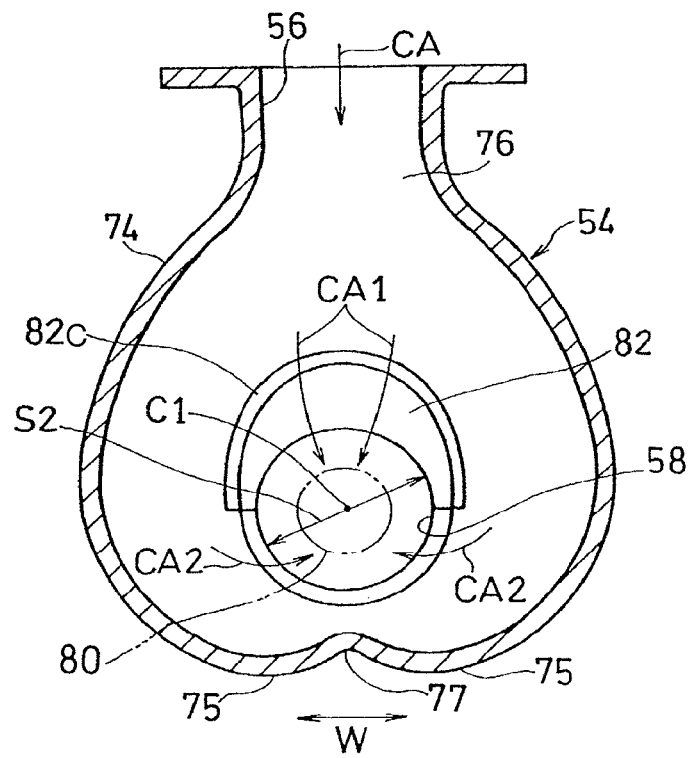
FIG. 5 is a cross sectional view taken along the line V-V in FIG. 4.

The duct body 74 shown in FIG. 5 has a lower portion formed with two bulge portions 75 and 75 each being smoothly curved so as to protrude downwardly in a side-by-side relation to each other, and a recess 77 is formed intermediate between the two bulge portions 75 and 75, that is, at an intermediate portion in the widthwise direction W. The shape of the duct body 74 may, however, not be necessarily limited to that shown and described, but may take any suitable shape in conformity with its installation space available provided that it will not interfere with any other instruments.

Figure 4:
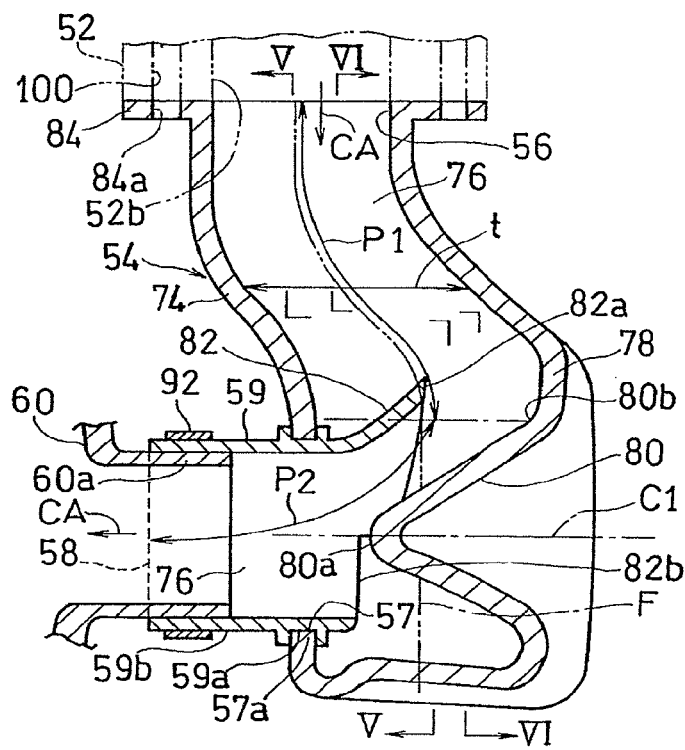
FIG. 4 is a longitudinal sectional view showing the air intake duct.

As best shown in FIG. 4, the duct outlet 58 of the air intake duct 54 is formed by fitting a separate tubular outlet member 59 to an opening 57 defined in the duct body 74. More specifically, the tubular outlet member 59 is inserted into the opening 57 in the duct body 74 and, after an edge portion 57a of the opening 57 has been engaged in a groove 59a formed in an outer periphery of the tubular outlet member 59, the tubular outlet member 59 is fixed to the duct body 74 by means of a bonding means such as, for example, a bonding agent. A downstream end of the tubular outlet member 59 forms the duct outlet 58 of the air intake duct 54. The tubular outlet member 59 is made of a member having an elasticity such as, for example, rubber.

An upper half of the tubular outlet member 59 on an upstream sides with respect to the direction of flow of the air is formed with a funnel 82 protruding inwardly of the duct body 74 and having its diameter increasing towards an inward direction, in other words, having a passage area gradually increasing towards the upstream side. The funnel 82 has an inner end, that is, an upstream end 82a positioned upstream of a tip 80a of the guide projection 80, but may be positioned either at the same position as that of the tip 80a of the guide projection 80 or at a position downstream of the tip 80a of the guide projection 80. In addition, the funnel 82 may be formed over the entire periphery of the duct outlet 58 or, alternatively, the funnel 82 itself may be dispensed with.

As hereinabove described, since the duct body 74 and the tubular outlet member 59 are members separate from each other, even the use of the funnel 82 makes it possible for the duct body 74 to be formed by the use of any known blow molding process. Also, the duct body 74 may be formed integrally with the tubular outlet member 59 having the funnel 82. In such case, the duct body 74 can be formed by the use of a split type mold assembly that is divided into two mold components along the chain line F shown in FIG. 4.

Figure 6:
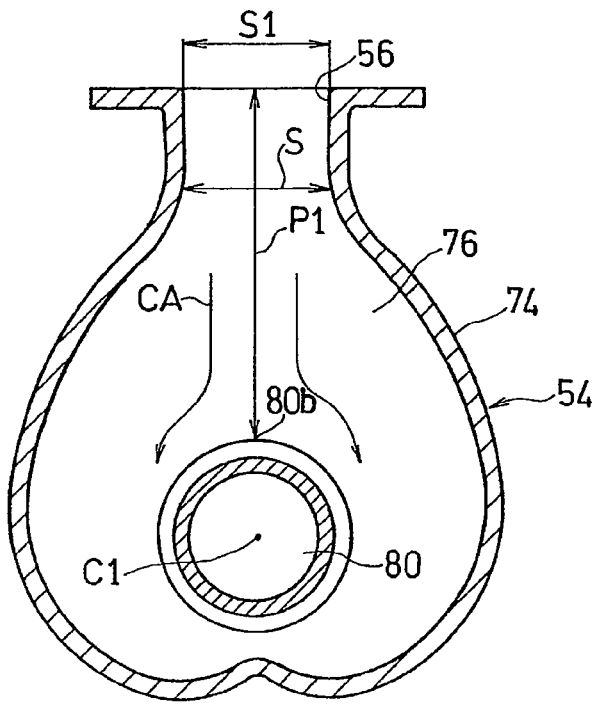
FIG. 6 is a cross sectional view taken along the line VI-VI in FIG. 4.

As best shown in FIG. 6, the air intake passage 76 defined inside the duct body 74 has an upstream portion ranging from the duct inlet 56 to a root portion 80b at an upper end of the guide projection 80, that is, a root portion 80b closest to the duct inlet 56, which upstream portion is formed with an outwardly flared passage portion P1 having a passage area S gradually increasing towards a downstream portion. The passage area S of this flared passage portion P1 is greater than the passage area S1 of the duct inlet 56. The flared passage portion P1 has a length greater than a downstream passage portion P2 at a location downstream of the flared passage portion P1 as best shown in FIG. 4. In other words, the passage portion P1 occupies a majority of the entire passage length formed by the passage portions P1 and P2. The passage area S2, best shown in FIG. 5, of the duct outlet 58 is substantially identical with the passage area S1 of the duct inlet 56. A portion formed inside the duct body 74, that is, a portion excluding a flow passage downstream portion defined by the tubular outlet member 59 has a passage area S that is greater than the passage area S1 of the duct inlet 56.

Figure 7:
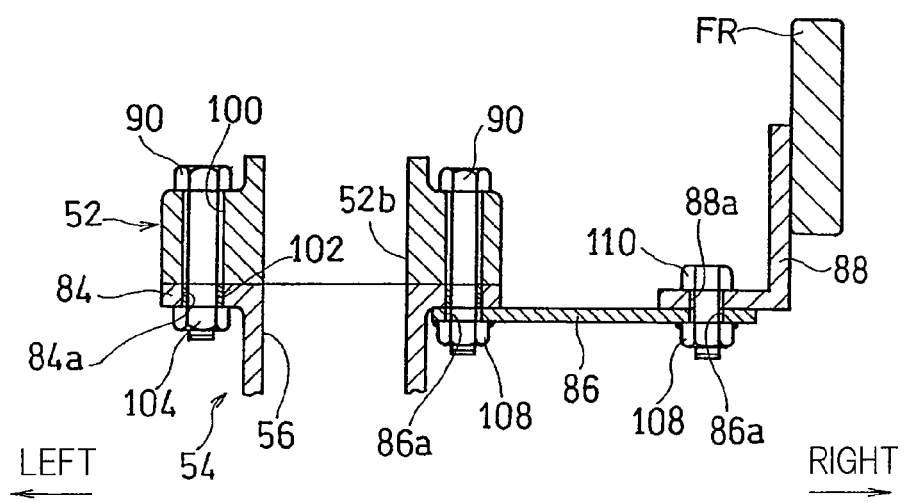
FIG. 7 is a longitudinal sectional view showing the air intake duct and its vicinity.

As shown in FIG. 3, the duct inlet 56 is formed with a generally rectangular, outwardly extending duct flange 84 having four throughholes 84a defined therein. In correspondence therewith, an outer peripheral portion of the outlet port 52b of the air intake control valve unit 52 has four insertion holes 100 defined therein. As shown in FIG. 7, a tubular collar 102 is inserted into each of the throughholes 84a and a corresponding fastening member 90 such as, for example, a bolt is inserted into the respective insertion hole 100 and the associated collar 102. Two of the fastening members 90 on one side inwardly of the widthwise direction of the motorcycle body (on a left side as viewed in FIG. 2) are firmly fastened with corresponding nuts 104. On the other hand, a portion of a mounting plate 86 for enabling the air intake control valve unit 52, shown in FIG. 2, and the air intake duct 54 to be supported by the motorcycle body is superimposed on a lower surface of the flange 84, the mounting plate 86 is also formed with four insertion holes 86a, and welded nuts 108 best shown in FIG. 7 are fixedly connected to an undersurface thereof. Two of the fastening members 90, which are on an outer side outwardly of the widthwise direction of the motorcycle body (a left side), are inserted respectively into two of the four insertion holes 86a, which are on an inner side inwardly of the widthwise direction of the motorcycle body (a right side) and are firmly then threaded into the associated welded nuts 108. In this way, the air intake control valve unit 52, the air intake duct 54 and the mounting plate 86 are connected together.

A portion of the mounting plate 86 remote from the air intake duct 54 is supported by the undersurface of a bracket 88 fitted to the motorcycle frame structure FR in a fashion overlapped. In other words, two fastening members 110 such as, for example, bolts are inserted into the two of the insertion holes 86a on the right side of the mounting plate 86 and two mounting holes 88a defined in the bracket 88 and are then threaded into the welded nuts 108 fixed to the undersurface of the mounting plate 86. Accordingly, the air intake control valve unit 52 and the air intake duct 54 are supported by the motorcycle frame structure FR through the mounting plate 86 and the bracket 88.

As shown in FIG. 4, the duct outlet 58 is fluid connected with the suction port 60a of the supercharger 60 by fastening a fixing member 92 such as, for example, a tube band around an outer peripheral surface 59b of the tubular outlet member 59 while the tubular outlet member 59 is engaged in an outer periphery of the suction port 60a of the supercharger 60.

In the description that follows, the function of the air intake duct 54 employed in the practice of the embodiment will be described in detail. Assuming that the motorcycle as shown in FIG. 1 is in a travelling condition, the incoming air A with respect to the direction of travel of the motorcycle is introduced through the air intake opening 40 and is then guided into the air cleaner unit 48 by way of the ram air duct 42, then the air duct 44 and finally the air induction tube 46. The purified air CA, which has been substantially purified as it flows through the air cleaner unit 48 in any manner known to those skilled in the art, is guided from the first intermediate tube 50 towards the air intake control valve unit 52 and is, after the flow thereof has been controlled by the air intake control valve unit 52, introduced into the air intake duct 54.

As shown in FIG. 6, the purified air CA introduced into the air intake duct 54 from above through the duct inlet 56 flows through the air intake passage 76 and is subsequently guided by the guide projection 80 so as to spread smoothly and uniformly in a peripheral direction about the axis C1 of the duct outlet 58. Accordingly, generation of turbulent flow of the air is suppressed. It is to be noted that, since the flow of the purified air CA is decelerated during the flow thereof through the flared passage P1 having the passage area S that is greater than the passage area S1 of the duct inlet 56, the frictional loss with an inner surface of the duct body 74 is lowered. Moreover, since the purified air CA is smoothly decelerated within the flared passage P1, generation of the turbulent flow is suppressed.

Figure 8:
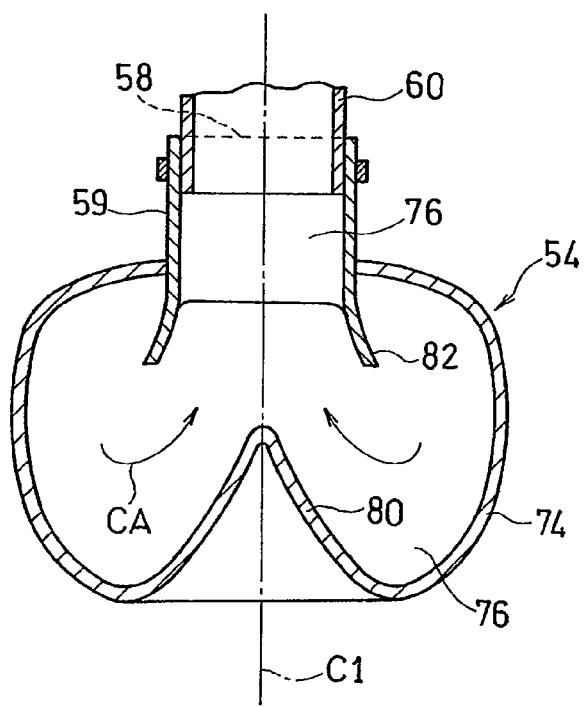
FIG. 8 is a horizontal sectional view showing the air intake duct.

Also, the purified air CA, which has been uniformized, is, after having been guided and deflected an angle of 90° by the guide projection 80 and the funnel 82 as shown in FIG. 8, introduced into the tubular outlet member 59. At this time, as best shown in FIG. 5, a portion CA1 of the purified air CA flows through a first tip 82*c* of an upper half of the funnel 82 and the remaining portion CA2 of the purified air CA is smoothly guided by an outer peripheral surface of the funnel 82 and then flows over a second tip 82*b* of a lower half of the funnel 82 before it is introduced into the tubular outlet member 59. The purified air CA so introduced into the tubular outlet member 59 is subsequently supplied from the duct outlet 58 at a downstream end of the tubular outlet member 59 into the supercharger 60, and the purified air CA compressed by the supercharger 60 is thereafter supplied to the combustion engine E through the surge tank 62 best shown in FIG. 1.

Figure 9:
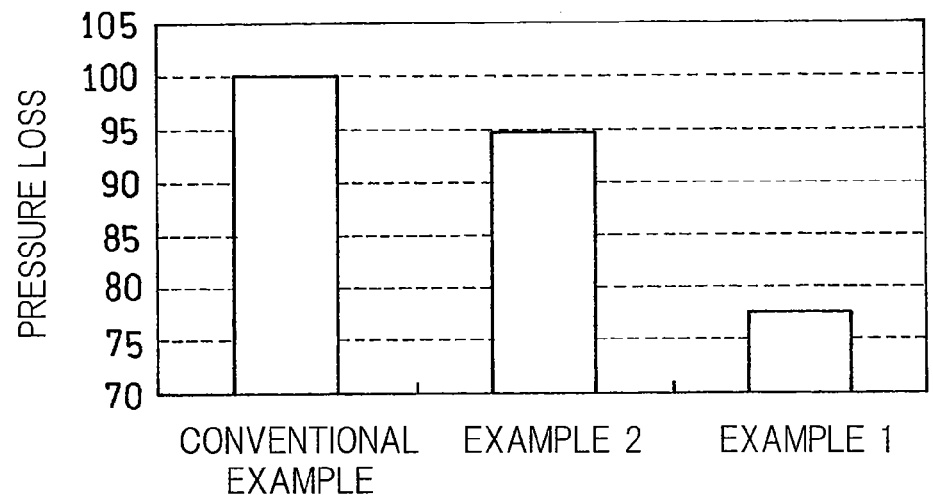
FIG. 9 is a chart showing results of measurement conducted to measure the pressure loss that takes place during the flow of intake air through the air intake duct.
Figure 9:
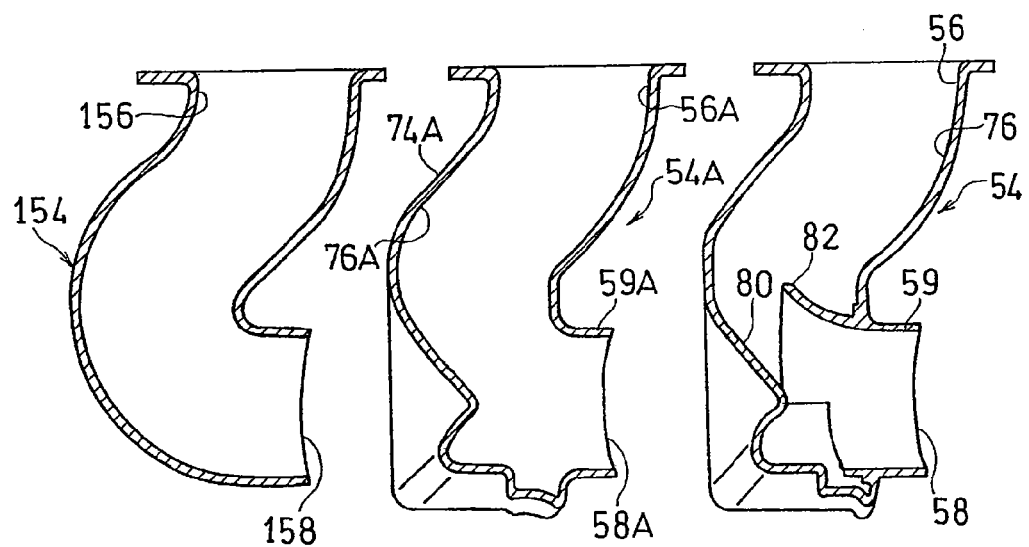

FIG. 9 illustrates a chart showing the comparison of respective pressure losses obtained with the conventional air intake duct and the air intake ducts 54 each designed in accordance with preferred embodiments of the present invention. In this chart of FIG. 9, the pressure loss exhibited by each of the air intake ducts according to examples 1 and 2 of the preferred embodiments is shown against the pressure loss of 100 exhibited by the conventional air intake duct.

The Conventional Example, which is an air intake duct 154 prepared from a pipe having a substantially equal passage area and curved at an angle of 90°. On the other hand, the Example 1 is the air intake duct 54 designed in accordance with the above described preferred embodiment and the Example 2 is an air intake duct 54A, which is similar to the air intake duct 54 of the Example 1, but differs therefrom in that no funnel 82 is employed. In this Example 2, the duct outlet, identified by 58A, is defined by an opening at a downstream end of a tubular outlet member 59A formed integrally of a duct body 74A. In other words, the entire air intake passage 76A extending from a duct inlet 56A to the duct outlet 58A is formed by the duct body 74A. It will readily be understood that the pressure loss exhibited by the Example 1 is reduced by about 22% of that exhibited by the Conventional Example 154 and the pressure loss exhibited by the Example 2 is reduced by about 6% of that exhibited by the Conventional Example 154.

With the preferred embodiment having been fully described hereinbefore, a major portion of the air intake passage 76 within the air intake duct 54 has the passage area S greater than that of the duct inlet 56 as clearly shown in FIG. 5 and, therefore, the velocity of flow of the intake air in that major portion of the air intake passage 76 is lowered down from the velocity at the duct inlet 56 and, hence, the flow passage loss attributable to the frictional loss at the inner surface of the air intake duct 54 is reduced. Also, since as shown in FIG. 4, the guide projection 80 of the conical shape is formed in the 90° curved air intake passage 76 at the wall surface 78, opposed to the duct outlet 58, towards the duct outlet 58, the purified air CA is smoothly guided towards the duct outlet 58 after having been guided and rectified by the guide projection 80. As a result thereof, the flow passage loss resulting from the turbulent flow within the air intake duct 54 can be reduced, and also the purified air CA, which has been rectified and is hence free from any turbulence, is introduced into the supercharger 60. In particular, since the guide projection 80 is so formed as to be coaxial with the axis C1 of the duct outlet 58, the flow of the intake air is so rectified as to allow the air flow to assume the flow uniform in a peripheral direction about the axis C1 of the duct outlet 58 as bets shown in FIG. 6 and, therefore, a bias of the air flow against the duct outlet 58 is suppressed and the purified air CA can be further smoothly guided towards the supercharger 60 best shown in FIG. 4, resulting in an increase of the supercharging efficiency of the supercharger 60.

By the effect of the reduction in flow passage loss and the rectification within the air intake duct 54, the supercharging efficiency of the supercharger 60 positioned downstream thereof can be increased. In particular, since at a site of the guide projection 80 where the frictional loss and the turbulence are susceptible to occur because the purified air CA is deflected 90°, the passage area S of the air intake passage 76 is sufficiently greater than the passage area S1 of the duct outlet 56 as best shown in FIG. 5, the purified air CA is reduced in flow velocity enough to suppress the frictional loss and the turbulence. At this moment, since the duct body 74 is, when viewed from the direction of the axis C1 of the duct outlet 58, gradually flared in width from the duct inlet 56 towards the duct outlet 58, the air intake passage 76 extends a substantial distance from the duct inlet 56 to a position near to the duct outlet 58 and has the passage area S gradually increasing from the duct inlet 56 towards the duct outlet 58, and, hence, the purified air CA is smoothly guided into the duct outlet 58 while the flow thereof is decelerated as it flows through the air intake passage 76. As a result, the friction at the inner surface of the air intake duct 54 can be lowered, and also separation of the air flow from the inner surface of the air intake duct 54 is suppressed and, therefore, the purified air CA is smoothly guided towards the supercharger 60 best shown in FIG. 4, resulting in the further increase of the supercharging efficiency of the supercharger 60.

Also, since the funnel 82 having the passage area increasing in a direction inwardly of the duct body 74 is formed in the duct outlet 58, the air flow can be throttled by the funnel 82 from inwardly of the air intake duct 54 towards the duct outlet 58, and hence, an undesirable occurrence of the separation in the vicinity of the duct outlet 58 is avoided. As a result thereof, the purified air CA is smoothly guided towards the supercharger 60 after having been sufficiently rectified, and therefore, the supercharging efficiency of the supercharger 60 can be further increased. In addition, since the funnel 82 is provided only in the upper half of the duct outlet 58, the structure is simplified.

Furthermore, since the duct outlet 58 is structured with a member separate from the duct body 74 and is inserted and supported in the suction port 60*a* of the supercharger 60, the air intake duct 54 can be easily connected between the air intake control valve unit 52 and the supercharger 60 merely by fastening the duct inlet 56 to the outlet port 52*b* of the air intake control valve unit 52.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing embodiment, the air duct 44 has been shown and described as employed as a member separate from the head block 2, the air duct 44 and the head block 2 may be formed integrally with each other.

Accordingly, such changes and modifications are, unless they depart from the scope of the present invention as delivered from the claims annexed hereto, to be construed as included therein.

REFERENCE NUMERALS

23 . . . Cylinder block
52 . . . Air intake valve control unit
52*b* . . . Outlet port of the air intake control valve
53*a* . . . Valve shaft of the air intake control valve
54 . . . Air intake duct
56 . . . Duct inlet
58 . . . Duct outlet
60 . . . Supercharger
60*a* . . . Suction port of the supercharger
60*b* . . . Axis of the supercharger
74 . . . Duct body
76 . . . Air intake passage
80 . . . Guide projection
82 . . . Funnel
90 . . . Fastening member
S . . . Passage area
C1 . . . Axis of the duct outlet
D1 . . . First direction
D2 . . . Second direction
P1 . . . Flared passage
E . . . Motorcycle combustion engine
X . . . Axis of the rotary shaft of the combustion engine

What is claimed is:

1. An air intake duct for connecting a suction port of a supercharger, comprising:
    a duct inlet oriented in a first direction;
    a duct outlet fluid connected with the suction port of the supercharger and oriented in a second direction substantially perpendicular to the first direction; and
    a duct body for defining an air intake passage extending from the duct inlet to the duct outlet; wherein
        the duct body has a portion confronting the duct outlet, and that portion of the duct body is formed with a guide projection that protrudes towards the duct outlet, and
        the guide projection is of a pyramid shape tapering toward the duct outlet, the guide projection has a tip end positioned on an axis of the duct outlet.

2. An air intake duct for connecting between an air intake control valve and a supercharger, comprising:
    a duct inlet fluid connected with an outlet port of the air intake control valve and oriented in a first direction;
    a duct outlet fluid connected with a suction port of the supercharger and oriented in a second direction substantially perpendicular to the first direction; and
    a duct body for defining an air intake passage extending from the duct inlet to the duct outlet;
    wherein
        the duct body has a portion confronting the duct outlet, and that portion of the duct body is formed with a guide projection that protrudes towards the duct outlet,
        the guide projection is formed in a fashion coaxial with an axis of the duct outlet, and
        the guide projection has an inclined surface relative to the axis of the duct outlet.

3. The air intake duct as claimed in claim 1, in which the guide projection is one of a conical shape, a pyramid shape or a circular truncated cone shape.

4. The air intake duct as claimed in claim 1, in which a major portion of the air intake passage is formed within the duct body and has a larger passage area than that of the duct inlet.

5. The air intake duct as claimed in claim 4, in which the duct body is, when viewed in a direction conforming to the axis of the duct outlet, gradually flared in width from the duct inlet towards the duct outlet.

6. The air intake duct as claimed in claim 1, in which the duct outlet is formed with a funnel having a passage area increasing in a direction inwardly of the duct body.

7. The air intake duct as claimed in claim 6, in which the duct inlet is formed in an upper portion of the duct body and the duct outlet is formed in a lower portion of the duct body and in which the funnel is formed only in an upper half of the duct outlet.

8. The air intake duct as claimed in claim 1, in which the duct inlet is fluid connected with the outlet port of the air intake control valve by means of a fastening member and the duct outlet is inserted into a suction port of the supercharger.

9. In a motorcycle, an air intake duct for connecting between an air intake control valve and a supercharger, the air intake duct being disposed rearwardly of a cylinder block of a combustion engine, wherein an improvement comprises:
    a duct inlet fluid connected with an outlet port of the air intake control valve and oriented in a first direction;
    a duct outlet fluid connected with a suction port of the supercharger and oriented in a second direction substantially perpendicular to the first direction; and
    a duct body for defining an air intake passage extending from the duct inlet to the duct outlet;
    wherein
        the duct body has a portion confronting the duct outlet, and that portion of the duct body is formed with a guide projection that protrudes towards the duct outlet,
        the guide projection is formed in a fashion coaxial with an axis of the duct outlet, the guide projection has an inclined surface relative to the axis of the duct outlet, and
        the air intake control valve has a valve shaft disposed parallel in a widthwise direction of a motorcycle body, and the supercharger has a shaft axis disposed parallel to an axis of a rotary shaft of the combustion engine.

10. The air intake duct as claimed in claim 1, wherein the guide projection is of a pyramid shape tapering toward the duct outlet.

11. The air intake duct as claimed in claim 1, wherein the inclined surface of the guide projection is of a curved shape.

12. The air intake duct as claimed in claim 1, in which an incoming air of a pressure equal or higher than the atmospheric pressure is introduced into the air duct through a ram air duct.

13. The air intake duct as claimed in claim 1, wherein the air intake control valve includes a butterfly valve.

14. The air intake duct as claimed in claim 13, wherein the butterfly valve has a valve shaft extending in the same direction as the axis of the duct outlet.

15. The air intake duct as claimed in claim 1, wherein a portion of an outer wall, which confronts the duct outlet, is depressed toward the duct outlet.

\* \* \* \* \*